Oct. 30, 1928.
J. O. CARREY
1,689,913
MULTIPLE FLY WHEEL
Filed Sept. 18, 1925     2 Sheets-Sheet 1
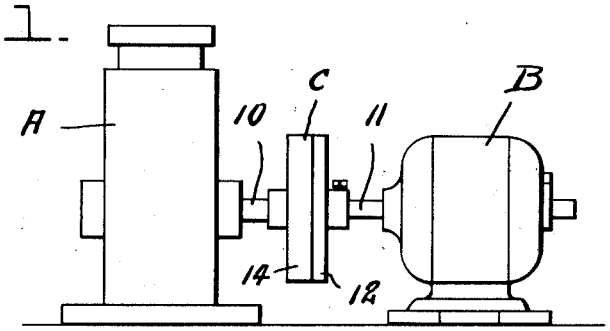
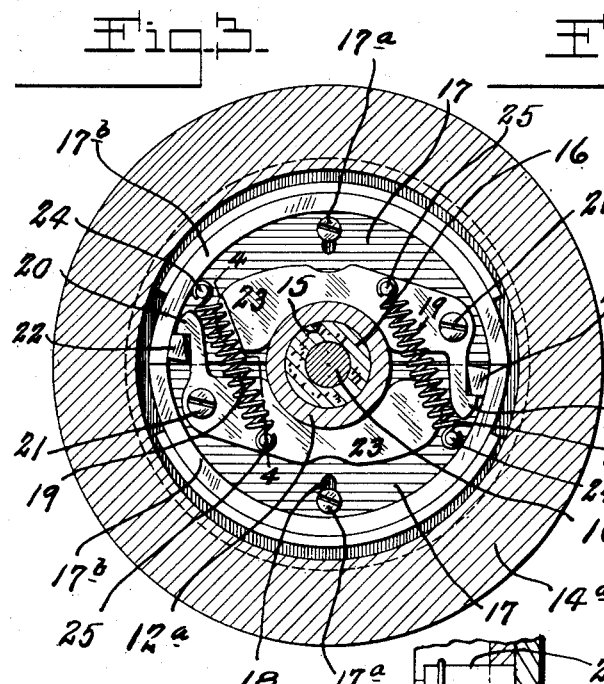
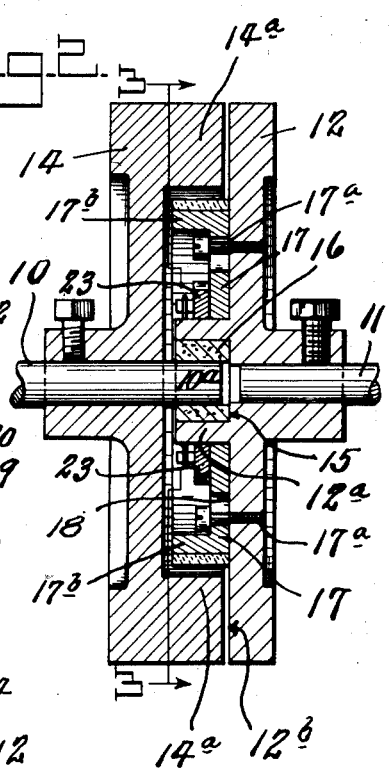
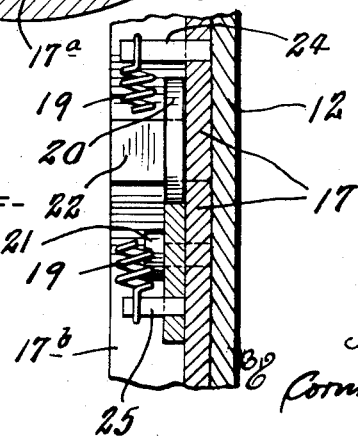
Inventor.
JOHN O. CARREY.
Cornwall, Bedell & James
Attorneys Oct. 30, 1928.

J. O. CARREY 1,689,913

MULTIPLE FLY WHEEL

Filed Sept. 18, 1925   2 Sheets-Sheet 2

Patented Oct. 30, 1928.

1,689,913

UNITED STATES PATENT OFFICE.

JOHN O. CARREY, OF ST. LOUIS, MISSOURI, ASSIGNOR TO CARREY-MORSE ENGINEERING COMPANY, OF ST. LOUIS, MISSOURI, A CORPORATION OF MISSOURI.

MULTIPLE FLYWHEEL.

Application filed September 18, 1925. Serial No. 57,138.

This invention relates to new and useful improvements in multiple fly wheels of the type disclosed in my copending application filed October 30, 1924, Serial No. 746,776, wherein the fly wheel is composed of two or more sections, one of which is in positive driving connection with a suitable prime mover, such as an electric motor, and the other section or sections are adapted to enter into driving engagement with the first section and operate in unison therewith when the latter attains the proper speed.

The object of the present invention is to provide mechanism for controlling the engagement between the driving and driven fly wheel sections whereby said driven section is positively withheld from engagement with the driving section until the latter has reached the required speed.

Further objects of the invention are to provide means for normally maintaining the two fly wheel sections positively disengaged from each other, said means being operable by centrifugal action to release suitable mechanism for effecting the interengagement of said fly wheel sections when the actuated or driving fly wheel section has reached its normal operative speed.

Other objects of the invention are to provide centrifugally controlled means for automatically engaging or releasing clutch members carried by the driving section so as to automatically effect the engagement or disengagement of the two fly wheel sections.

With these and other objects in view, my invention consists in certain novel features of construction and arrangement of parts, hereinafter more fully described and claimed, and illustrated in the accompanying drawings in which—

Figure 1 is a side elevational view showing the multiple fly wheel interposed between an electric motor and the apparatus to be driven thereby.

Figure 2 is a vertical cross section through said fly wheel.

Figure 3 is a transverse cross section taken on line 3—3 of Figure 2.

Figure 4 is a detail cross section taken on line 4—4 of Figure 3.

Figure 5 is an enlarged view similar to Figure 3 but showing the parts in moved or interengaged positions.

Figure 6 is a perspective detail view of one of the frictional members utilized for effecting the interengagement between the fly wheel sections and one of the releasable members used for locking said frictional members in disengaged or retracted positions.

In the operation of my sectional fly wheel it was found that the movable clutch members carried by the driving fly wheel section would move outwardly gradually as the speed of the driving section increased and before said section reached its predetermined speed. This gradual outward movement of the clutch members would create friction and retard the operation of the driving fly wheel section so that it would require a longer time for the latter to reach its proper speed, and in the means time cause untimely operation of the driven fly wheel section or slippage between the clutch members and said driven fly wheel section.

In the present invention, the clutch or frictional members are positively held against outward movement until the driving fly wheel section has reached its proper speed when said friction members are released and are free to move by centrifugal action into engagement with the driven fly wheel section. In this manner all unnecessary friction and the consequent wear and tear on the friction members is eliminated and the two fly wheel sections are positively interengaged and disengaged at the proper speeds.

Referring by numerals to the accompanying drawings, A indicates an apparatus which it is desired to operate, such as a compressor, B is a prime mover, in the present instance an electric motor, and C is the multiple fly wheel establishing operative connection between shaft 10 of apparatus A and shaft 11 of motor B. This fly wheel C consists, in the present instance, of two sections, driving section 12 which is fixed to shaft 11 and driven section 14 which is fixed to shaft 10. These sections are substantially of the same diameter and occupy positions adjacent to and in coaxial relation with each other. Section 12 is provided with a hub extension 12$^a$ projecting in an opposite direction to motor shaft 11 and has an enlarged bore 15 in which is arranged suitable material 16 for receiving the extreme end 10$^a$ of shaft 10 which projects past the driven section 14. Section 12 is formed with a flat face 12$^b$ facing section 14 and movably mounted on said face is a pair of segmental pieces 17 which are movable in radial direction. They are held in position by screws or pins 17ª which are secured to the section 12 and project through radial slots 18 formed in said segmental pieces. Each pin 17ª is provided with an enlarged head by means of which each piece 17 is held against displacement.

Driven section 14 which is fixed to shaft 10 is provided with an annular flange 14ª which projects laterally and has its face arranged adjacent to face 12ᵇ there being sufficient operating clearance left therebetween. Each segmental piece 17 is provided with a laterally projecting flange 17ᵇ which has arranged on its outer face a layer of suitable material, such as brake lining, which is adapted when sections 17 are moved into expanded positions to engage the inner circular face of flange 14ª, thereby establishing driving connection between the two fly wheel sections. Sections 17 are held in contracted positions by coiled springs 19 as shown in Figure 3 so that normally said sections occupy contracted or inner positions as shown in said figure. When in this position, said pieces are locked against outward movement by hooks 20 which are pivotally mounted at 21 to each of said segmental pieces and engage lugs 22 formed on the opposite pieces. These hooks are provided with weighted extensions 23 which are designed to be operated by centrifugal action when section 12 is operated at the proper speed to move said hooks out of engagement with said lugs, thereby permitting segmental pieces 17 to fly outwardly into engagement with the flange 14ª of section 14. Preferably, one end of each spring 19 is connected at one end to a pin 24 seated in piece 17 and at the opposite end to a pin 25 carried by weighted extension 23 of the opposite piece so that one set of springs can be used for retaining pieces 17 and hooks 20 in closed positions.

The sections 12 and 14 combined constitute the fly wheel of the desired weight and dimensions and the weight of section 12 is preferably less than the weight of section 14 in order to facilitate the starting operation of the prime mover. The hooks or locking members 20 serve as safety or control means preventing untimely outward movement of frictional members 17, thereby insuring the operation of section 12 at proper speed before section 14 is cut in. As soon as the speed falls below a certain degree, springs 19 overcome the centrifugal action and retract blocks 17, thereby disengaging the two sections. When in retracted positions, blocks 17 are engaged by hooks 20, which lock said blocks against outward movement until section 12 reaches a speed sufficient to overcome by centrifugal action springs 19 and actuate extensions 23, causing thereby hooks 20 to move into releasing position.

I claim:

1. In a multiple fly wheel, the combination of a pair of coaxial fly wheel sections of substantially equal diameters, one of which is provided with an annular flange presented toward the other section, a plurality of segmental pieces movably mounted on said other section and enclosed by said annular flange and provided with peripheral convex portions adapted to engage the concave face of the flange of the first section, said pieces being operable by centrifugal action, coil springs for retracting said pieces, and a retaining member pivotally mounted on each segmental piece and adapted to engage the opposite piece and lock the latter in retracted position, said retaining members being operable by centrifugal action to release said pieces at a speed greater than that required to operate said segmental pieces to insure proper operative engagement of the latter with said annular flange.

2. In a multiple fly wheel, the combination of a pair of coaxial fly wheel sections, one of which is provided with an annular flange disposed laterally adjacent to the other section, a plurality of segmental pieces mounted on said other section for movement in radial directions with respect to the axes of said sections and provided with peripheral convex portions adapted to engage the concave face of the flange of the first section, said segmental pieces being operable by centrifugal action, coil springs for retracting said pieces, a retaining member pivotally mounted on each of said pieces and adapted to engage the opposite piece and lock said pieces in retracted positions, said retaining members being operable by centrifugal action to release said segmental pieces at a speed greater than that required to operate said segmental pieces, said coil springs being connected at their opposite ends to said segmental pieces and the corresponding retaining members for maintaining said segmental pieces in locking engagement with said retaining members.

3. In a multiple fly wheel, the combination of a driving fly wheel section and a driven fly wheel section arranged coaxially and adjacent to each other, the latter being provided with a laterally projecting annular flange, segmental pieces mounted on the face of said driving fly wheel section and enclosed by said flange, said segmental pieces being movable in radial direction relative to the axes of said sections, coil springs for maintaining said segmental pieces in retracted positions, said segmental pieces being movable outwardly by centrifugal action, and hooks pivotally mounted on said segmental pieces and adapted to engage laterally projecting lugs of the opposite pieces, said hooks being adapted to hold said segmental pieces in retracted positions and having weighted extensions whereby said hooks are operated by centrifugal action to release said pieces at predetermined speeds for permitting said segmental pieces to move outwardly into engagement with the flange of the driven fly wheel section.

4. A fly wheel comprising in combination a pair of axially aligned sections mounted independently of each other in juxtaposed relation, one of said sections being positively driven and the other section being provided with a recess forming an internal circular face, a plurality of segmental blocks mounted on the first section and movable under centrifugal action transversely of the axis of rotation into operative engagement with said second section, thereby interengaging said sections, laterally projecting lugs on said blocks, and a weighted hook pivotally mounted on each block and engaging the lug of the opposite block for preventing the untimely outward movement of said blocks, said hooks being operable to release said blocks at a greater speed than that required to operate said segmental blocks whereby when the latter are released they are brought into positive engagement with the internal circular face of the other section.

5. A fly wheel comprising in combination a pair of axially aligned sections mounted independently of each other in juxtaposed relation, one of said sections being positively driven and the other section being provided with a recess forming an internal circular face, a plurality of segmental blocks mounted on the first section and enclosed in said recess, said blocks being movable under centrifugal action radially relative to the axis of said section into operative engagement with said second section thereby interengaging said sections, lugs laterally projecting on said blocks, a hook pivotally mounted on each block and engaging the lug of the opposite block for preventing the untimely outward movement of said blocks, said hooks being operable to release said blocks at a predetermined speed, and springs connected at one of their ends to one of the blocks and at the opposite end to a corresponding hook for retracting said blocks and engaging said hooks therewith when the speed of said fly wheel falls below a predetermined speed.

In testimony whereof I hereunto affix my signature this fifteenth day of July, 1925.

JOHN O. CARREY.